(12) United States Patent
Yoshihara

(10) Patent No.: US 7,097,318 B2
(45) Date of Patent: Aug. 29, 2006

(54) MOBILE PHONE PROVIDED WITH LIGHTING, LIGHTING CONTROL METHOD AND LIGHTING CONTROL PROGRAM

(75) Inventor: Shigeo Yoshihara, Kakegawa (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 10/694,061

(22) Filed: Oct. 28, 2003

(65) Prior Publication Data

US 2004/0085745 A1   May 6, 2004

(30) Foreign Application Priority Data

Oct. 30, 2002   (JP)   ............................. 2002-316623

(51) Int. Cl.
*H04M 1/22*   (2006.01)
*G03B 15/03*   (2006.01)

(52) U.S. Cl. .............................. 362/88; 362/8; 362/13; 348/370; 396/429; 455/344

(58) Field of Classification Search .................... 362/8, 362/11, 13, 88, 234; 348/14.02, 370–371, 348/552; 396/155, 157–158, 164, 182, 429; 455/74, 344, 127.1

See application file for complete search history.

(56) References Cited

U.S. PATENT DOCUMENTS

| | | | |
|---|---|---|---|
| 5,010,412 A | 4/1991 | Garriss | |
| 6,344,874 B1 | 2/2002 | Helms et al. | |
| 6,424,843 B1 | 7/2002 | Reitmaa et al. | |
| 2001/0034222 A1 | 10/2001 | Roustaei et al. | |
| 2001/0053703 A1* | 12/2001 | Kobayashi | ................... 455/556 |
| 2001/0055987 A1 | 12/2001 | Tsuchida | |
| 2003/0013484 A1* | 1/2003 | Nishimura et al. | ......... 455/556 |
| 2003/0107656 A1* | 6/2003 | Ito et al. | .................. 348/216.1 |
| 2003/0164881 A1* | 9/2003 | Ohe et al. | .............. 348/207.99 |

FOREIGN PATENT DOCUMENTS

| | | |
|---|---|---|
| CN | 1264981 A | 8/2000 |
| EP | 1 211 869 A1 | 6/2002 |
| JP | 2001-76891 | 3/2001 |
| JP | 2001-320461 | 11/2001 |
| JP | 2002-207236 | 7/2002 |
| JP | 2003-309765 | 10/2003 |
| JP | 2004-192001 | 7/2004 |

\* cited by examiner

*Primary Examiner*—Alan Cariaso
*Assistant Examiner*—Jason Han
(74) *Attorney, Agent, or Firm*—Young & Thompson

(57) ABSTRACT

A mobile phone provided with lighting devices capable of capturing not only a still image but also a moving image in the dark. When a user sets the lighting of a light emitting section to ON at the time of capturing an image, the light emitting section is controlled so as to illuminate a subject for the most suitable time for capturing the image regardless of capturing a still image or moving image. Accordingly, it becomes possible to capture an image in the dark successfully. Moreover, the mobile phone can be used as a flashlight by continuously turning on the light emitting section that would be used when capturing an image. Accordingly, the mobile phone may be used for lighting when finding a keyhole, searching for something, etc. in the dark.

18 Claims, 3 Drawing Sheets

F I G. 2
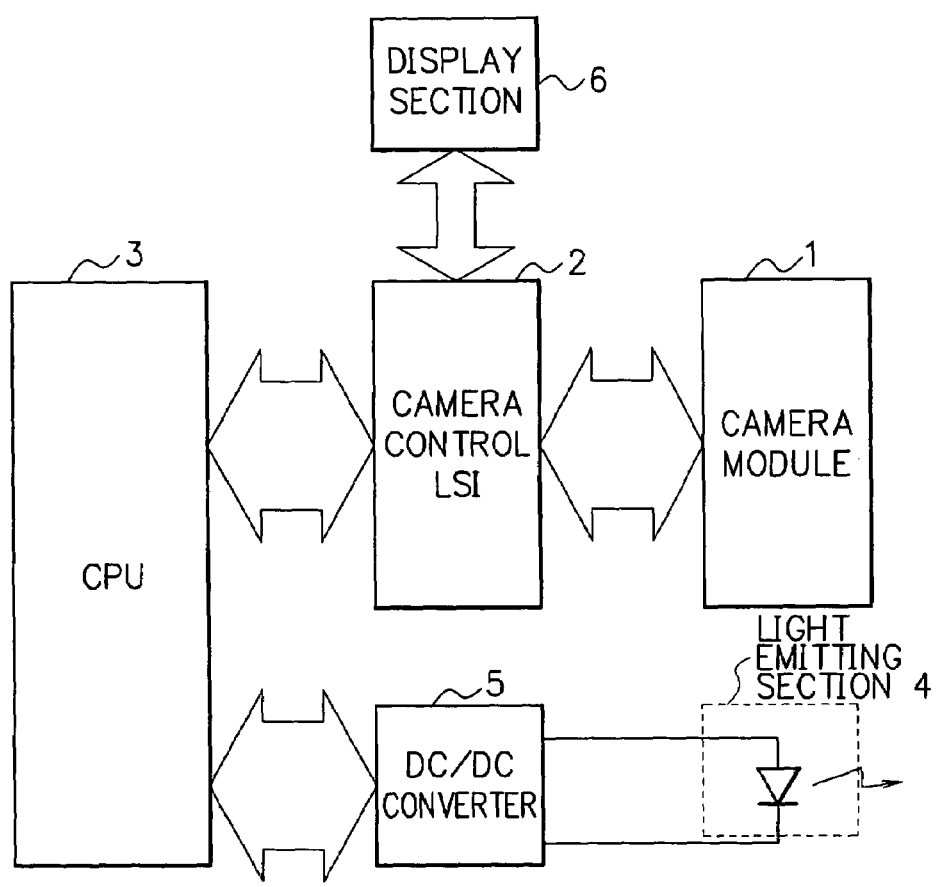

F I G. 3
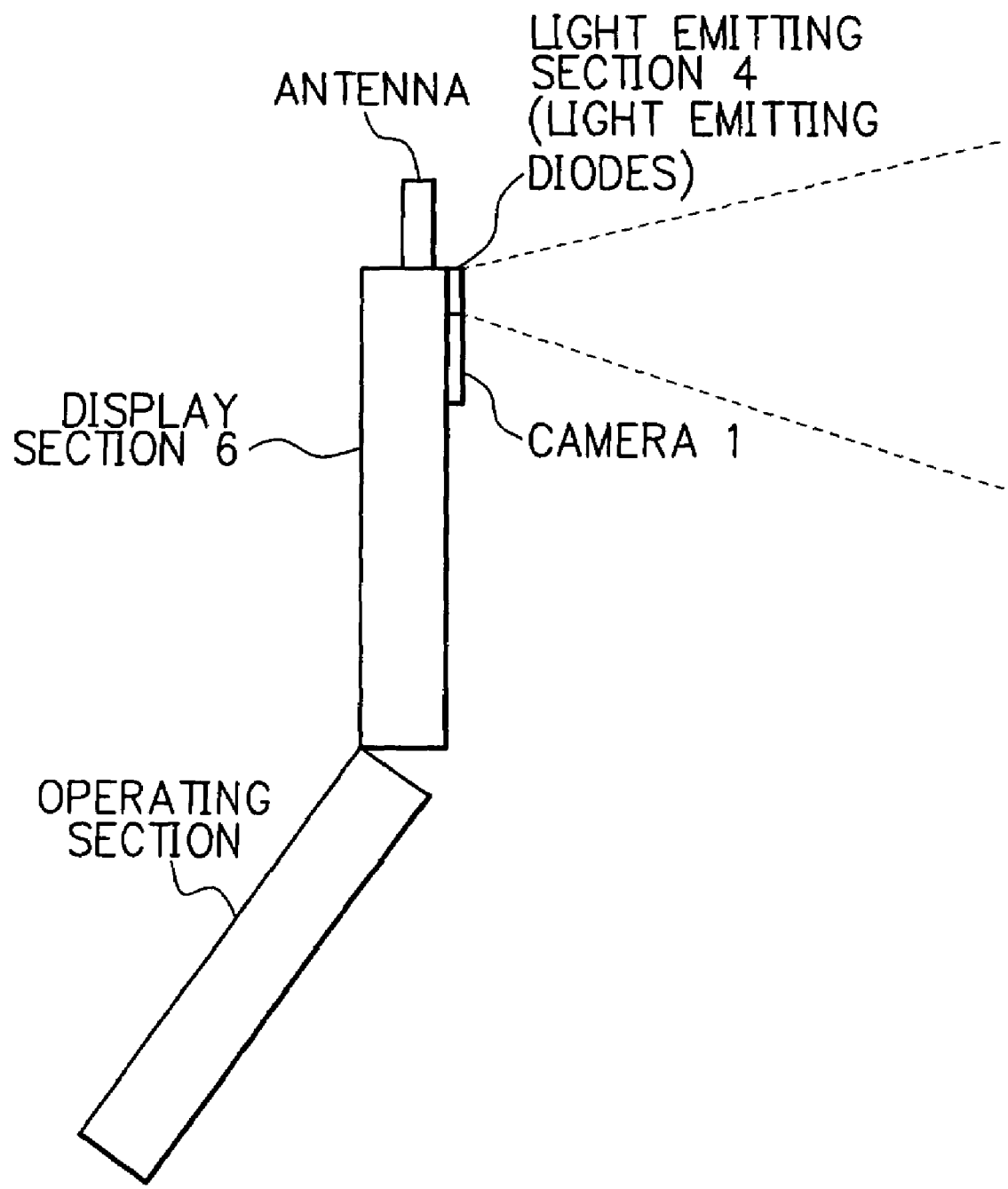

MOBILE PHONE PROVIDED WITH LIGHTING, LIGHTING CONTROL METHOD AND LIGHTING CONTROL PROGRAM

BACKGROUND OF THE INVENTION

The present invention relates to a mobile phone provided with lighting and an image capturing device for transmitting image information such as a self-portrait to a receiving end, a method and a program thereof, and in particular, to a mobile phone provided with lighting having a lighting function to illuminate a subject when capturing images, a lighting control method and a program thereof.

DESCRIPTION OF THE RELATED ART

Small and lightweight mobile terminal devices have become widely used in tandem with the advances of communication technology and semiconductor technology. Moreover, along with the popularization of the mobile terminal devices, the performance is increasingly improved to fulfill the requirements from users. For example, a mobile terminal device provided with an image capturing device such as a digital camera has been developed and practically used. The mobile terminal device provided with a digital camera has an image-information transmitting and receiving function in addition to a conventional voice-information and text-information transmitting and receiving function.

A user may take his/her picture (self-portrait) with the mobile terminal device provided with a digital camera and transmits it to a receiving end. Accordingly, they can communicate with each other while identifying the other party with the image.

One example of conventional mobile phones is disclosed in Japanese Patent Application Laid-Open No. 2001-320461. FIG. 1 shows the appearance of this mobile phone. As shown in FIG. 1, main body 10 is a thin box to be easily carried. In the interior space of the main body 10, at least one light emitting diode 11 (used for illuminating a subject) is disposed in place so that the side of the light emitting section is exposed to the outside. In addition, an input terminal of the light emitting diode 11 is wired to a direct current power source unit so that the diode 11 can be turned on. Moreover, a switching circuit for turning on and off the light emitting diode 11 is built partway along the path of the wired circuit. Furthermore, an open-close operating button 12 for the switching circuit is set to the body 10 in place so as to be exposed to the outside.

As mentioned above, a mobile phone provided with a digital camera capable of taking pictures and capturing moving images are increasingly needed. Accordingly, a technique for taking pictures and capturing moving images in the dark becomes required. If a lighting function is provided to a mobile phone, the mobile phone would be allowed not only to perform flash photography but also to capture moving images in the dark.

SUMMARY OF THE INVENTION

It is therefore an object of the present invention to provide a mobile phone provided with lighting capable of capturing not only still images but also moving images in the dark, a lighting control method and a program thereof.

It is another object of the present invention to provide a mobile phone with lighting capable of continuously emitting light to illuminate the dark as a flashlight in addition to emitting light for capturing still or moving images, a lighting control method and a program thereof.

According to a third aspect of the present invention, in the second aspect, the control section controls the light emitting section to emit light so that the intensity of light emitted from the light emitting section at the time of continuous lighting while the capturing section is not active becomes lower than the intensity of light emitted from the light emitting section at the time of capturing an image.

an operation inputting section through which a user inputs information to operate the mobile phone; and a control section for controlling the respective sections, wherein:

the control section controls the light emitting section so as to continuously emit light while capturing a moving image so that a time length for emitting light varies depending on whether a still image or moving image is captured.

According to a second aspect of the present invention, in the first aspect, when an operation to activate the light emitting section is executed while the capturing section is not active, the control section controls the light emitting section so as to continuously emit light until a predetermined operation is executed.

According to a third aspect of the present invention, in the second aspect, the control section controls the light emitting section to be made emit light so that the intensity of light emitted from the light emitting section at the time of continuous lighting while the capturing section is not active becomes lower than the intensity of light emitted from the light emitting section at the time of capturing an image.

According to a fourth aspect of the present invention, in the third aspect:

the light emitting section comprises a plurality of light emitting diodes; and the control section controls the number of the light emitting diodes to emit light so that the intensity of light emitted from the light emitting diodes at the time of continuous lighting while the capturing section is not active becomes lower than the intensity of light emitted from the light emitting diodes at the time of capturing an image.

According to a fifth aspect of the present invention, there is provided a lighting control method for a mobile phone provided with lighting comprising a capturing means for capturing an image, a light emitting means for emitting light to illuminate a subject when capturing an image, and an operation inputting means through which a user inputs information to operate the mobile phone, comprising a first control step of:

controlling the light emitting means so as to continuously emit light while capturing a moving image so that a time length for emitting light varies depending on whether a still image or moving image is captured.

According to a sixth aspect of the present invention, in the fifth aspect, the lighting control method comprises a second control step of, when an operation to activate the light emitting means is executed while the capturing means is not active, controlling the light emitting means so as to continuously emit light until a predetermined operation is executed.

According to a seventh aspect of the present invention, in the sixth aspect, the lighting control method comprises a third control step of controlling the light emitting means to emit light so that the intensity of light emitted from the light emitting means at the time of continuous lighting while the capturing means is not active becomes lower than the intensity of light emitted from the light emitting diodes at the time of capturing an image.

According to an eighth aspect of the present invention, in the seventh aspect, wherein:

the light emitting means comprises a plurality of light emitting diodes; and at the third control step, the number of the light emitting diodes to emit light is controlled so that the intensity of light emitted from the light emitting diodes at the time of continuous lighting while the capturing means is not active becomes lower than the intensity of light emitted from the light emitting diodes at the time of capturing an image.

According to a ninth aspect of the present invention, there is provided a lighting control program for a mobile phone provided with lighting comprising a capturing means for capturing an image, a light emitting means for emitting light to illuminate a subject when capturing an image, and an operation inputting means through which a user inputs information to operate the mobile phone, executing the process of:

controlling the light emitting means to continuously emit light while capturing a moving image so that a time length for emitting light varies depending on whether a still image or a moving image is captured.

According to a tenth aspect of the present invention, in the ninth aspect, the lighting control program executes a process of, when an operation to activate the light emitting means is executed while the capturing means is not active, controlling the light emitting means so as to continuously emit light until a predetermined operation is executed.

According to an eleventh aspect of the present invention, in the tenth aspect, the lighting control program executes a process of controlling the light emitting means to emit light so that the intensity of light emitted from the light emitting means at the time of continuous lighting while the capturing means is not active becomes lower than the intensity of light emitted from the light emitting means at the time of capturing an image.

According to a twelfth aspect of the present invention, in the eleventh aspect:

the light emitting means comprises a plurality of light emitting diodes, and the lighting control program executes the process of controlling the number of the light emitting diodes to emit light so that the intensity of light emitted from the light emitting diodes at the time of continuous lighting while the capturing means is not active becomes lower than the intensity of light emitted from the light emitting diodes at the time of capturing an image.

BRIEF DESCRIPTION OF THE DRAWINGS

The objects and features of the present invention will become more apparent from the consideration of the following detailed description taken in conjunction with the accompanying drawings in which:

FIG. 2 is a block diagram showing a configuration of a mobile phone provided with lighting according to an embodiment of the present invention; and FIG. 3 is a diagram showing an appearance of the mobile phone provided with lighting according to the embodiment of the present invention.

DESCRIPTION OF THE PREFERRED EMBODIMENT

Figure 1:
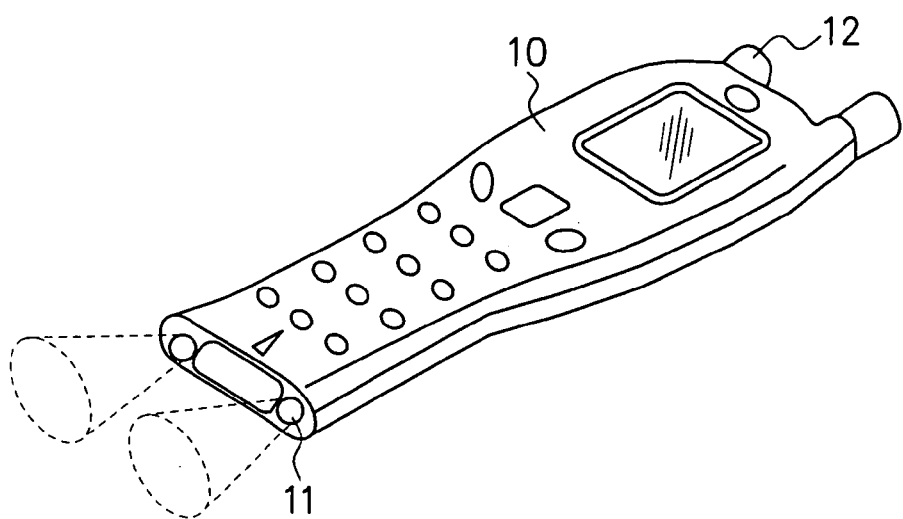
FIG. 1 is a diagram showing an appearance of a conventional mobile phone.

Referring now to the drawings, an embodiment of the present invention is explained in detail. FIGS. 2 and 3 shows the mobile phone provided with lighting according to an embodiment of the present invention.

First, an explanation will be given of a circuitry of a mobile phone provided with lighting according to an embodiment of the present invention referring to FIG. 2.

As shown in FIG. 2, the mobile phone provided with lighting comprises a camera module 1, a camera module control LSI 2, a CPU 3, a light emitting section 4, a DC/DC converter 5 and a display section 6. The camera module 1 is configured with a sensor for capturing images, a DSP (Digital Signal Processor) for performing digital conversion, and a control circuit. The camera module control LSI 2 has control over the camera module 1, the display of the display device, image expanding and compressing processes, and the like. The CPU 3 controls the whole mobile phone device. The light emitting section 4 is configured with a plurality of a light emitting diodes. The DC/DC converter 5 drives the light emitting section 4. The display section 6 is composed of a LCD and the like.

In the following, an explanation will be given of an appearance and an operation procedure of the mobile phone provided with lighting according to the embodiment of the present invention referring to FIG. 3.

As shown in FIG. 3, the lighting emitting section 4 is mounted in/on the back surface (the opposite side of the display section 6) of the upper body of the mobile phone toward the same direction as the camera module 1. When the light emitting diodes are lit, the light is diffused in the direction as shown by the dotted lines in FIG. 3 to illuminate a subject.

When the camera is active, the CPU 3 controls the DC/DC converter 5 depending on an image to be captured (still or moving image) through the camera module 1, and controls ON/OFF operation of the light emitting section 4.

Namely, when capturing a still image in the dark, the CPU 3 controls the light emitting section 4 to turn on plural light emitting diodes for the most suitable time length. On the other hand, when capturing a moving image, the CPU 3 controls the light emitting section 4 so that plural light emitting diodes continuously emit light in proportion to the capturing time.

A user has only to set ON/OFF of the camera lighting (namely, only to perform keying according to the directions displayed on the display section 6). According to the setting, the light emitting section 4 emits light in proportion to the time length of capturing a still or moving image. For instance, when capturing a still image, the light emitting section 4 emits light approximately one second, and when capturing a moving image, the light emitting section 4 continuously emits light over a few seconds to several dozen seconds (or minutes).

The CPU 3 turns off the light emitting diodes at the light emitting section 4 in any one of the cases where: a predetermined time has passed while the light emitting diodes are in ON state; a shooting has finished; and an exit operation has been performed.

Moreover, when the mobile phone is used as a flashlight in the dark while the camera is not active, a user sets a state of continuous lighting to ON/OFF through keys of the mobile phone according to the instructions displayed on the display section 6. Accordingly, the CPU 3 controls the plural light emitting diodes to continuously emit light for the use of a flashlight. In response to the ON/OFF setting, the CPU 3 executes ON/OFF control over the DC/DC converter 5 and the light emitting section 4.

For example, a user may turn on the light emitting diodes by continuously pushing a predetermined key during a predetermined time. Moreover, while the light emitting diodes are emitting light, this may be indicated on a main screen of the display section 6. Furthermore, the light emitting diodes may be turned off in any one of the cases where: one of the keys is pushed while lighting; the body of the mobile phone is folded while lighting; the other event (such as reception of an incoming call) occurs while lighting; and the like.

Incidentally, when the mobile terminal is used as a flashlight, the intensity of light emitted from the light emitting diodes may be weakened in comparison with a case of capturing images. Accordingly, the power consumption can be reduced by changing the output from the DC/DC converter 5.

Otherwise, the number of the light emitting diodes to be turned on may be reduced when continuously emitting light without using the camera (namely, using the lighting as a flashlight), while all of the diodes are turned on when using the camera to capture an image. For example, a total of 4 diodes (2 diodes+2 diodes) may be turned on when using the camera, and only 2 diodes be turned on when not using the camera.

As described hereinbefore, when a user sets the lighting of the light emitting section 4 to ON when using or operating the camera, the light emitting section 4 can be controlled so as to illuminate a subject for the most suitable time length regardless of capturing a sill image or moving image. Accordingly, it becomes possible to suitably capture an image in the dark.

Moreover, the mobile phone may be used as a flashlight by continuously emitting light through the light emitting diodes, which are normally used for capturing an image. Accordingly, it becomes possible to use the mobile phone as a lighting apparatus, for example, when a user wants to find a keyhole or search for something in the dark.

Incidentally, the light emitting diodes may be controlled so that the intensity of light emitted therefrom when used as a flashlight becomes lower than the intensity of light emitted therefrom when used for capturing an image. Accordingly, it becomes possible to reduce the power consumption of the mobile phone.

Incidentally, the present invention is applied to a foldable mobile phone in this embodiment, it may be applied to the other types of mobile phones.

As set forth hereinbefore, according to the present invention, the control means controls the light emitting means so as to continuously emit light while capturing a moving image so that a time length for emitting light varies depending on whether a still image or moving image is captured. Accordingly, the light emitting means is controlled so as to illuminate a subject for an optimum time regardless of capturing a still image or moving image. Therefore, it becomes possible to suitably capture an image in the dark.

Moreover, when a user operates the mobile phone to activate the light emitting means while the camera is not active, the light emitting means is controlled to continuously emit light until a predetermined input operation is performed. Accordingly, the mobile phone may be used as a flashlight, for example, when finding a keyhole or searching for something in the dark.

Furthermore, the light emitting means is controlled so that the intensity of light emitted therefrom at the time of continuous lighting (when the mobile phone is used as a flashlight) becomes lower than the intensity of light emitted therefrom at the time of capturing an (still or moving) image. Accordingly, it becomes possible to reduce the power consumption owing to the light emitting means.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A mobile phone provided with lighting, comprising:
   a capturing section for capturing an image;
   a light emitting section for emitting light to illuminate a subject when capturing an image;
   an operation inputting section through which a user inputs information to operate the mobile phone; and
   a control section for controlling the respective sections, wherein:
   the control section controls the light emitting section so as to continuously emit light while capturing a moving image so that a time length for emitting light varies depending on whether a still image or moving image is captured, and
   wherein, the light emitting section comprises a plurality of light emitting diodes, and the control section controls the number of the light emitting diodes that emit light so that the intensity of light emitted from the light emitting diodes at the time of continuous lighting while the capturing section is not active is lower than the intensity of light emitted from the light emitting diodes at the time of capturing an image.

2. The mobile phone of claim 1, wherein when an operation to activate the light emitting section is executed while the capturing section is not active, the control section controls the light emitting section so as to continuously emit light until a predetermined operation is executed.

3. A mobile phone provided with lighting, comprising:
   a capturing section for capturing an image;
   a light emitting section for emitting light to illuminate a subject when capturing an image;
   an operation inputting section through which a user inputs information to operate the mobile phone; and
   a control section for controlling the respective sections, wherein:
   the control section controls the light emitting section so as to continuously emit light while capturing a moving image so that a time length for emitting light varies depending on whether a still image or moving image is captured; and
   the control section controls the light emitting section to continuously emit light while the capturing section is not active with an intensity that is lower than the intensity of light emitted from the light emitting section at the time of capturing an image.

4. A mobile phone provided with lighting as claimed in claim 3, wherein:
   the light emitting section comprises a plurality of light emitting diodes; and
   the control section controls the number of the light emitting diodes that emit light so that the intensity of light emitted from the light emitting diodes at the time of continuous lighting while the capturing section is not active is lower than the intensity of light emitted from the light emitting diodes at the time of capturing an image.

5. A mobile phone provided with lighting, comprising:
a capturing section for capturing an image;
a light emitting section for emitting light to illuminate a subject when capturing an image;
an operation inputting section through which a user inputs information to operate the mobile phone; and
a control section for controlling the respective sections, wherein:
the control section controls the light emitting section so as to continuously emit light while capturing a moving image so that a time length for emitting light varies depending on whether a still image or moving image is captured;
when an operation to activate the light emitting section is executed while the capturing section is not active, the control section controls the light emitting section so as to continuously emit light until a predetermined operation is executed; and
the control section controls the light emitting section to emit light so that the intensity of light emitted from the light emitting section at the time of continuous lighting while the capturing section is not active is lower than the intensity of light emitted from the light emitting section at the time of capturing an image.

6. A mobile phone provided with lighting as claimed in claim 5, wherein:
the light emitting section comprises a plurality of light emitting diodes; and
the control section controls the number of the light emitting diodes that emit light so that the intensity of light emitted from the light emitting diodes at the time of continuous lighting while the capturing section is not active is lower than the intensity of light emitted from the light emitting diodes at the time of capturing an image.

7. A lighting control method for a mobile phone provided with lighting comprising a capturing means for capturing an image, a light emitting means for emitting light to illuminate a subject when capturing an image, and an operation inputting means through which a user inputs information to operate the mobile phone, comprising a first control step of:
controlling the light emitting means so as to continuously emit light while capturing a moving image so that a time length for emitting light varies depending on whether a still image or moving image is captured,
wherein the light emitting means comprises a plurality of light emitting diodes, and further comprising a second control step in which the number of the light emitting diodes that emit light is controlled so that the intensity of light emitted from the light emitting diodes at the time of continuous lighting while the capturing means is not active is lower than the intensity of light emitted from the light emitting diodes at the time of capturing an image.

8. The lighting control method of claim 7, further comprising
a third control step of, when an operation to activate the light emitting means is executed while the capturing means is not active, controlling the light emitting means so as to continuously emit light until a predetermined operation is executed.

9. A lighting control method for a mobile phone provided with lighting comprising a capturing means for capturing an image, a light emitting means for emitting light to illuminate a subject when capturing an image, and an operation inputting means through which a user inputs information to operate the mobile phone, comprising:
a first control step of controlling the light emitting means so as to continuously emit light while capturing a moving image so that a time length for emitting light varies depending on whether a still image or moving image is captured; and
a second control step of controlling the light emitting means to continuously emit light while the capturing means is not active with an intensity that is lower than the intensity of light emitted from the light emitting means at the time of capturing an image.

10. A lighting control method as claimed in claim 9, wherein:
the light emitting means comprises a plurality of light emitting diodes; and
at the second control step, the number of the light emitting diodes that emit light is controlled so that the intensity of light emitted from the light emitting diodes at the time of continuous lighting while the capturing means is not active is lower than the intensity of light emitted from the light emitting diodes at the time of capturing an image.

11. A lighting control method for a mobile phone provided with lighting comprising a capturing means for capturing an image, a light emitting means for emitting light to illuminate a subject when capturing an image, and an operation inputting means through which a user inputs information to operate the mobile phone, comprising:
a first control step of controlling the light emitting means so as to continuously emit light while capturing a moving image so that a time length for emitting light varies depending on whether a still image or moving image is captured;
a second control step of, when an operation to activate the light emitting means is executed while the capturing means is not active, controlling the light emitting means so as to continuously emit light until a predetermined operation is executed; and
a third control step of controlling the light emitting means to emit light so that the intensity of light emitted from the light emitting means at the time of continuous lighting while the capturing means is not active is lower than the intensity of light emitted from the light emitting means at the time of capturing an image.

12. A lighting control method as claimed in claim 11, wherein:
the light emitting means comprises a plurality of light emitting diodes; and
at the third control step, the number of the light emitting diodes that emit light is controlled so that the intensity of light emitted from the light emitting diodes at the time of continuous lighting while the capturing means is not active is lower than the intensity of light emitted from the light emitting diodes at the time of capturing an image.

13. A lighting control program in a computer readable medium, for a mobile phone provided with lighting comprising a capturing means for capturing an image, a light emitting means for emitting light to illuminate a subject when capturing an image, and an operation inputting means through which a user inputs information to operate the mobile phone, the program executing the process of:
controlling the light emitting means to continuously emit light while capturing a moving image so that a time length for emitting light varies depending on whether a still image or a moving image is captured,
wherein the light emitting means comprises a plurality of light emitting diodes, and wherein the program further executes the process of controlling the number of the light emitting diodes that emit light so that the intensity of light emitted from the light emitting diodes at the time of continuous lighting while the capturing means is not active is lower than the intensity of light emitted from the light emitting diodes at the time of capturing an image.

14. The lighting control program of claim 13, wherein when an operation to activate the light emitting means is executed while the capturing means is not active, the program controls the light emitting means so as to continuously emit light until a predetermined operation is executed.

15. A lighting control program in a computer readable medium, for a mobile phone provided with lighting comprising a capturing means for capturing an image, a light emitting means for emitting light to illuminate a subject when capturing an image, and an operation inputting means through which a user inputs information to operate the mobile phone, the program executing the process of:

controlling the light emitting means to continuously emit light while capturing a moving image so that a time length for emitting light varies depending on whether a still image or a moving image is captured; and controlling the light emitting means to continuously emit light while the capturing means is not active with an intensity that is lower than the intensity of light emitted from the light emitting means at the time of capturing an image.

16. A lighting control program as claimed in claim 15, wherein the light emitting means comprises a plurality of light emitting diodes, the program further executing the process of:

controlling the number of the light emitting diodes that emit light so that the intensity of light emitted from the light emitting diodes at the time of continuous lighting while the capturing means is not active is lower than the intensity of light emitted from the light emitting diodes at the time of capturing an image.

17. A lighting control program in a computer readable medium, for a mobile phone provided with lighting comprising a capturing means for capturing an image, a light emitting means for emitting light to illuminate a subject when capturing an image, and an operation inputting means through which a user inputs information to operate the mobile phone, the program executing the process of:

controlling the light emitting means to continuously emit light while capturing a moving image so that a time length for emitting light varies depending on whether a still image or a moving image is captured;

when an operation to activate the light emitting means is executed while the capturing means is not active, controlling the light emitting means so as to continuously emit light until a predetermined operation is executed; and controlling the light emitting means to emit light so that the intensity of light emitted from the light emitting means at the time of continuous lighting while the capturing means is not active is lower than the intensity of light emitted from the light emitting means at the time of capturing an image.

18. A lighting control program as claimed in claim 17 wherein the light emitting means comprises a plurality of light emitting diodes, the program further executing the process of:

controlling the number of the light emitting diodes to emit light so that the intensity of light emitted from the light emitting diodes at the time of continuous lighting while the capturing means is not active is lower than the intensity of light emitted from the light emitting diodes at the time of capturing an image.

* * * * *